United States Patent
Naudot et al.

(10) Patent No.: US 7,313,150 B2
(45) Date of Patent: Dec. 25, 2007

(54) TELECOMMUNICATIONS SIGNAL RELAY NODE

(75) Inventors: Gildas Naudot, Tours (FR); Abdelkrim Moulehiawy, Paris (FR); Giovanni Volpe, Clichy (FR)

(73) Assignee: Alcatel, Paris (FR)

(*) Notice: Subject to any disclaimer, the term of this patent is extended or adjusted under 35 U.S.C. 154(b) by 1049 days.

(21) Appl. No.: 10/267,572

(22) Filed: Oct. 10, 2002

(65) Prior Publication Data

US 2003/0095645 A1  May 22, 2003

(30) Foreign Application Priority Data

Oct. 12, 2001 (FR) .................................. 01 13187

(51) Int. Cl.
*H04J 3/16* (2006.01)
(52) U.S. Cl. ...................... 370/433; 370/466; 370/473
(58) Field of Classification Search ................ 370/208, 370/145, 335, 336, 330, 328, 210, 347, 324, 370/321, 433–435, 465, 466, 473, 474; 379/93.09, 379/399.01, 88.13, 390.02; 375/145, 222, 375/229, 336, 130

See application file for complete search history.

(56) References Cited

U.S. PATENT DOCUMENTS

| | | | |
|---|---|---|---|
| 5,809,085 A * | 9/1998 | Goodson et al. | 375/320 |
| 5,912,894 A * | 6/1999 | Duault et al. | 370/433 |
| 6,091,721 A | 7/2000 | Greenberg et al. | |
| 6,580,785 B2 * | 6/2003 | Bremer et al. | 379/88.13 |
| 6,839,425 B1 * | 1/2005 | Huang et al. | 379/399.01 |
| 6,970,467 B1 * | 11/2005 | Sunaga et al. | 370/395.1 |
| 2002/0076034 A1 * | 6/2002 | Prabhu et al. | 379/390.02 |

FOREIGN PATENT DOCUMENTS

EP  0 928 085 A1  7/1999

* cited by examiner

*Primary Examiner*—Chau Nguyen
*Assistant Examiner*—Kenneth R Hartmann
(74) *Attorney, Agent, or Firm*—Sughrue Mion, Pllc.

(57) ABSTRACT

A relay node is provided for coupling telephone, facsimile or data terminals to a digital packet telecommunications network. The relay node includes a signal discriminator for determining the type of signal coming from a terminal coupled to the node, from amongst a plurality of signal types, and a plurality of software relay devices each adapted to process a respective type of signal and controlled by the discriminator in order to apply to each signal a form of relay processing corresponding to the signal type.

14 Claims, 1 Drawing Sheet

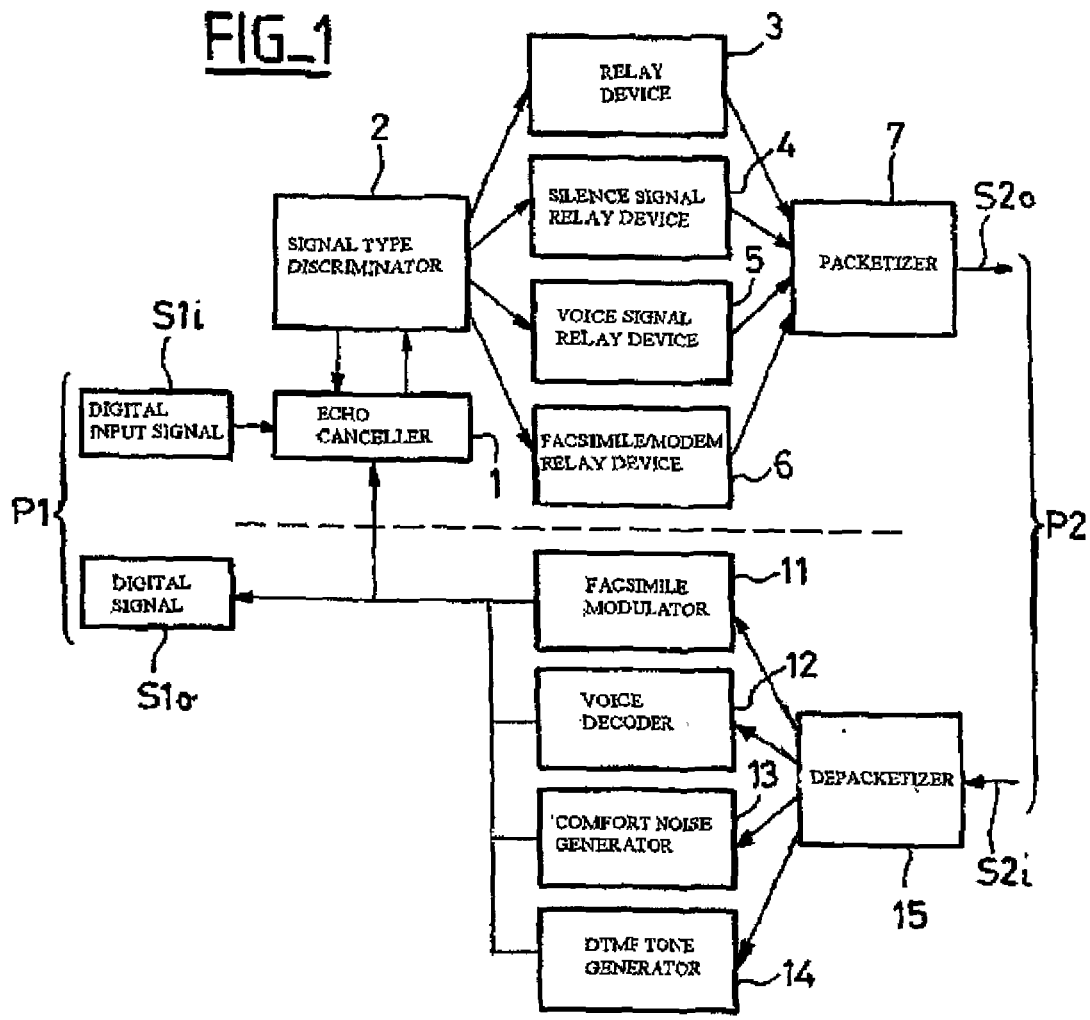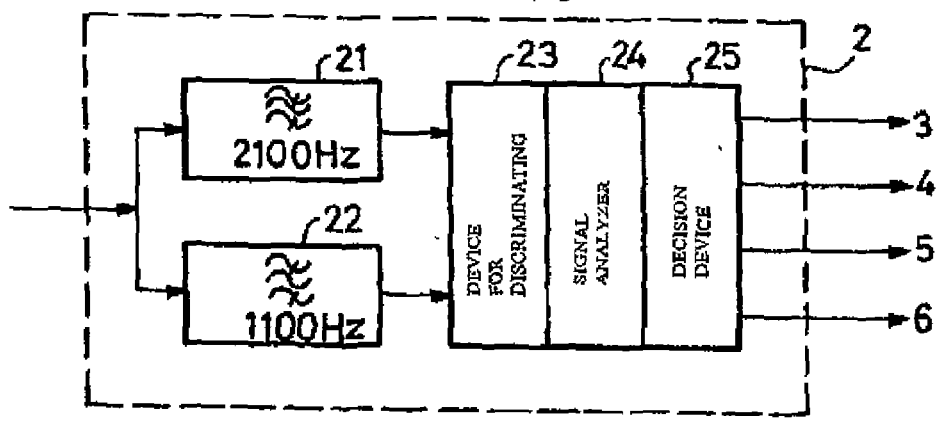

TELECOMMUNICATIONS SIGNAL RELAY NODE

The invention relates to a telecommunications signal relay node. This kind of node is used at the periphery of a digital telecommunications network, in particular a packet transmission network conforming to the Internet Protocol or the Frame Relay protocol. Various types of terminal can be connected to this kind of node by a conventional analog or digital telephone line, such as:
  a telephone,
  a facsimile machine,
  a modem.

A relay node converts the telephone, facsimile, or data signal supplied by a terminal into data packets appropriate to the telecommunications network. However, the conversion is not effected by a single method, since the method has to match each type of signal. A relay node processes in parallel a plurality of signals corresponding to a plurality of terminals. For example, to set up a voice call from an analog telephone terminal across an Internet Protocol network it is necessary to sample, digitize and compress the signal supplied by the telephone terminal and to carry out the converse functions for the other call direction. The relay functions for facsimile or for data transmission via a modem are different because other types of transmission method are then used that are specifically optimized for those types of signal. The relay node must therefore choose an appropriate relay method for each terminal that sets up a call.

The fixed assignment of a terminal type to each telephone line connected to a node is known in the art. In practice, this entails providing a configuration parameter dedicated to the terminal type for each port of the node. The node can therefore be programmed in advance to apply the respective relay methods appropriate to each line. This way of discriminating the terminal type is not practical because it lacks flexibility. It is not possible to connect any terminal to any line without modifying the value of the node port configuration parameters. In particular, it is not possible to connect a telephone and a facsimile machine to the same line and to use them alternately. Nor is it possible to use a multifunction terminal (a combined telephone/facsimile machine, for example).

The object of the invention is to remedy this drawback.

The invention provides a relay node for coupling terminals to a digital data packet telecommunications network, which node is characterized in that it comprises:
  means for determining the type of signal coming from a terminal coupled to the node, from amongst a plurality of signal types, and
  a plurality of relay means each adapted to process a respective type of signal and controlled by the means for determining the signal type in order to apply to each signal a form of relay processing corresponding to the signal type.

Because it has means for determining the terminal type by determining the type of signals that it sends, in particular during the call set-up phase, and because these means activate respective relay means appropriate to each signal, a node characterized in the above manner automatically matches the relay method to the type of terminal that is connected to a line connected to the node.

The invention will be understood better and other features of the invention will become apparent in the light of the following description and the accompanying drawings:

FIG. 1 is a block diagram of an embodiment of a relay node of the invention, and FIG. 2 is a block diagram of an embodiment of a signal type discriminator included in this embodiment of a relay node of the invention.

The embodiment shown in FIG. 1 comprises:
  a port P1 connected by a line (not shown) to a terminal (not shown) which can be a telephone, a facsimile machine or a modem; the port P1 receives a digital input signal S1i supplied directly by the terminal if it is a digital terminal or by an analog-to-digital converter upstream of the port P1 if it is an analog line;
  a port P2 connected by a digital line (not shown) to an Internet Protocol digital packet data transmission network (not shown), for example;
  an echo canceller 1 receiving the digital input signal S1i arriving at the port P1 and a signal S1o which is supplied to the terminal by the node via the port P1, which supplies a digital signal S1o directly to the terminal if it is a digital terminal or supplies the signal S1o to a digital-analog converter (not shown) downstream of the port P1 if it is an analog line;
  a signal type discriminator 2 having:
    an input connected to an output of the echo canceller 1,
    a first output connected to an inhibit input of the echo canceller 1, and
    second, third, fourth and fifth outputs, only one of which supplies a signal, as a function of the type of signal sent by the terminal: tone signal, voice signal, silence signal, facsimile signal, or modem signal;
  a relay device 3 for dual tone multi-frequency (DTMF) tones, operative throughout a call; the device 3 has an input connected to the second output of the discriminator 2;
  a silence signal relay device 4 having an input connected to the third output of the discriminator 2;
  a voice signal relay device 5 operative during a voice call and having an input connected to the fourth output of the discriminator 2;
  a facsimile or modem signal relay device 6 operative during a facsimile or file transmission call and having an input connected to the fifth output of the discriminator 2;
  a packetizer 7 having four inputs connected to respective outputs of the relay devices 3 to 6 and having an output supplying a series of data packets to the port P2;
  a de-packetizer 15 having an input receiving a series of packets S2i that the network has supplied to the port P2 and having first, second, third and fourth outputs respectively supplying (as appropriate) a tone signal, a voice signal, a silence signal, a facsimile signal or a modem signal extracted from the series of packets received;
  a facsimile modulator 11 operative during a facsimile call and having an input connected to the first output of the de-packetizer 15 and an output connected to the port P1 to supply a facsimile signal to the terminal;
  a voice decoder 12 operative during a voice call and having an input connected to the second output of the de-packetizer 15 and an output connected to the port 1 to supply a voice signal to the terminal;
  a comfort noise generator 13 operative during periods of silence in a telephone call and having an input connected to the second output of the de-packetizer 15 and an output connected to the port P1 to supply a noise signal to the terminal; and
  a dual tone multi-frequency (DTMF) tone generator 14 operative during signaling periods of a telephone call and having an input connected to the fourth output of the de-packetizer 15 and an output connected to the port P1 to supply a signaling signal to the terminal.

The signal discriminator 2 selects the relay method to be applied to the signal sent by the terminal, routing that signal to only one of the relay devices 3 to 6. It also inhibits the echo canceller 1 during a facsimile call.

In a preferred embodiment, all of the components described above are provided by an appropriately programmed signal processor. In particular, the devices 3-6 and 11-14 are preferably implemented as software.

FIG. 2 shows a block diagram of one embodiment of the signal type discriminator 2. It comprises:

two band-pass filters 21 and 22 centered on the frequencies 2 100 Hz and 1 100 Hz, respectively, and each having an input connected to the input of the device 2;

a device 23 for discriminating between a 2 100 Hz tone, a 1 100 Hz tone, silence (always subject to some level of noise), or some other signal (in particular voice);

a signal analyzer 24 which determines if a tone pulse has a duration within a predetermined interval, to verify if it is one of the tones expected by the node, or which analyses a 2 100 Hz tone to detect the presence or absence of amplitude modulation at 15 Hz and to detect phase jumps of ±180°; and a decision device 25 which determines the signal type as a function of the amplitude of the output signal from the filters 21 and 22 and as a function of the result of the analysis effected by the signal analyzer 24, the decision device 25 having four outputs constituting the four outputs of the device 2, for relaying the input signal to the output that corresponds to the signal type that has been determined.

Facsimile and modem signals conform to standards known to the person skilled in the art (ITU-T V.8, V.25, V.21). They are recognized by the discriminator device 23 and the signal analyzer 24, which are programmed to recognize characteristics defined by those standards. The signals are then routed by the decision device 25 to the relay device 6 in the case of a facsimile or modem signal.

Voice signals are routed to the voice signal relay device 5 for compression in accordance with a standard compression protocol (ITU-T G.711, G.723, G.726, G.729) chosen depending on the configuration of the transmission channel across the network. These speech compression algorithms are those most widely used in systems enabling voice to be transported on packet mode networks (IP, Frame Relay, ATM, etc.).

Detection of silence temporarily interrupts coding to reduce the compressed data bit rate. The comfort noise analyzer 4 analyses the background noise in the signal and supplies to the remote device the characteristics of that noise for generating comfort noise. Activation of this function and the silence detection level can be configured separately for each channel.

The person skilled in the art will be able to adapt the node according to the invention to discriminate and relay any other type of signal that might be transported in the future, for example a video signal.

The invention claimed is:

1. A relay node for coupling terminals to a digital data packet telecommunications network, said relay node comprising:

means for determining a type of signal coming from a terminal coupled to the relay node, from amongst a plurality of signal types, and a plurality of relay means for processing said type of said signal, and controlled by the means for determining, to apply to each said signal a form of relay processing corresponding to the type of said signal, wherein the means for determining comprises:

two band-pass filters centered on the frequencies 2100 Hz and 1100 Hz, respectively, that receive the signal for which said type is to be determined;

a device for discriminating between a 2100 Hz tone, a 1100 Hz tone, silence or other signal, said device for discriminating being coupled to outputs of the two band-pass filters;

a signal analyzer coupled to the discriminator device to determine if a tone pulse has a duration in an interval and to analyze a 2100 Hz tone to detect a presence or an absence of amplitude modulation at 15 Hz and phase jumps of ±180°; and a decision device for choosing the type of the signal as a function of the amplitude of the signal at the output of each of the filters and the result of the analysis of signals by the signal analyzer.

2. The node of claim 1, wherein said other signal comprises a video signal.

3. The node of claim 1, further comprising an echo canceller coupled between said means for determining and said terminal.

4. The node of claim 1, wherein outputs of said decision device are coupled to:

a relay device that is operative throughout a call and is configured to process dual tone multi-frequency (DTMF) tones;

a silence signal relay device;

a voice signal relay device operative during a voice call; and a facsimile or modem signal relay device operative during a facsimile or file transmission call, wherein a packetizer is coupled to outputs of each of said relay device, said silence signal relay device, said voice signal, and said facsimile or modem signal relay device, said packetizer having an output supplying a series of data packets to a network-side port.

5. A relay node for coupling terminals to a digital data packet telecommunications network, said relay node comprising:

means for determining a type of signal coming from a terminal coupled to the relay node, from amongst a plurality of signal types, and a plurality of relay means for processing said type of said signal, and controlled by the means for determining, to apply to each said signal a form of relay processing corresponding to the type of said signal, said plurality of relay means comprising:

a relay device that is operative throughout a call and is configured to process dual tone multi-frequency (DTMF) tones;

a silence signal relay device;

a voice signal relay device operative during a voice call;

a facsimile or modem signal relay device operative during a facsimile or file transmission call; and a packetizer coupled to outputs of each of said relay device, said silence signal relay device, said voice signal, and said facsimile or modem signal relay device, said packetizer having an output supplying a series of data packets to a network-side port.

6. The node of claim 5, further comprising:

a DTMF tone generator operative during signaling periods of a telephone call, and supplying a signaling signal to a user-side port; a silence signal relay device;

a voice decoder operative during a voice call and supplying a voice signal to said user-side port;
a facsimile modulator operative during said facsimile call and supplying a facsimile signal to said user-side port;
a comfort noise generator operative during periods of silence in said telephone call and supplying a noise signal to the user-side port; and
a depacketizer coupled to inputs of each of said facsimile modulator, said voice decoder, said comfort noise generator and said DTMF tone generator, said depacketizer having an input receiving a series of data packets from said network-side port.

7. The node of claim 5, further comprising an echo canceller coupled between said means for determining and said terminal.

8. A relay node for coupling terminals to a digital data packet telecommunications network, said relay node comprising:
a signal type discriminator configured to determine a type of signal coming from a terminal coupled to the relay node; and
a plurality of relay devices that perform processing depending on the type of signal as determined by the signal type discriminator, to apply to each said signal a form of relay processing corresponding to the type of said signal,
wherein the signal type discriminator comprises:
two band-pass filters centered on the frequencies 2100 Hz and 1100 Hz, respectively, that receive the signal for which said type is to be determined;
a discriminator device that discriminates between a 2100 Hz tone, a 1100 Hz tone, silence or other signal, wherein said discriminator device is coupled to outputs of the two band-pass filters;
a signal analyzer coupled to the discriminator device to determine if a tone pulse has a duration in an interval, and to analyze a 2100 Hz tone to detect a presence or an absence of amplitude modulation at 15 Hz and phase jumps of ±180°; and
a decision device that determines the type of the signal as a function of the amplitude of the signal at the output of each of the two band-pass filters and the result of the analysis of signals by the signal analyzer.

9. The node of claim 8, wherein outputs of said decision device are coupled to:
a relay device that is operative throughout a call and is configured to process dual tone multi-frequency (DTMF) tones;
a silence signal relay device;
a voice signal relay device operative during a voice call; and
a facsimile or modem signal relay device operative during a facsimile or file transmission call, wherein a packetizer is coupled to outputs of each of said relay device, said silence signal relay device, said voice signal, and said facsimile or modem signal relay device, said packetizer having an output supplying a series of data packets to a network-side port.

10. The node of claim 8, wherein said other signal comprises a video signal.

11. The node of claim 8, further comprising an echo canceller coupled between said signal type discriminator and said terminal.

12. A relay node for coupling terminals to a digital data packet telecommunications network, said relay node comprising:
a signal type discriminator configured to determine a type of signal coming from a terminal coupled to the relay node; and
a plurality of relay devices that perform processing depending on the type of signal as determined by the signal type discriminator, to apply to each said signal a form of relay processing corresponding to the type of said signal,
said plurality of relay devices comprising:
a relay device that is operative throughout a call and is configured to process dual tone multi-frequency (DTMF) tones;
a silence signal relay device;
a voice signal relay device operative during a voice call;
a facsimile or modem signal relay device operative during a facsimile or file transmission call; and
a packetizer coupled to outputs of each of said relay device, said silence signal relay device, said voice signal, and said facsimile or modem signal relay device, said packetizer having an output supplying a series of data packets to a network-side port.

13. The node of claim 12, further comprising:
a DTMF tone generator operative during signaling periods of a telephone call, and supplying a signaling signal to a user-side port; a silence signal relay device;
a voice decoder operative during a voice call and supplying a voice signal to said user-side port;
a facsimile modulator operative during said facsimile call and supplying a facsimile signal to said user-side port;
a comfort noise generator operative during periods of silence in said telephone call and supplying a noise signal to the user-side port; and
a depacketizer coupled to inputs of each of said facsimile modulator, said voice decoder, said comfort noise generator and said DTMF tone generator, said depacketizer having an input receiving a series of data packets from said network-side port.

14. The node of claim 12, further comprising an echo canceller coupled between said signal type discriminator and said terminal.

* * * * *